United States Patent
McMillan et al.

(10) Patent No.: US 6,818,829 B1
(45) Date of Patent: Nov. 16, 2004

(54) BURIED SPLICE ENCLOSURE

(75) Inventors: Brian McMillan, Spring Hill, KS (US); Doug Klamm, Wellsville, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 10/608,994

(22) Filed: Jun. 27, 2003

(51) Int. Cl.[7] .......................... H02G 15/02; H01R 4/00
(52) U.S. Cl. ................ 174/74 R; 174/77 R; 174/88 R
(58) Field of Search ....................... 174/74 R, 74 A, 174/77 R, 79, 84 R, 86, 87, 88 R

(56) References Cited

U.S. PATENT DOCUMENTS

| | | | |
|---|---|---|---|
| 3,934,076 A | * | 1/1976 | Smith .......................... 174/87 |
| 4,039,742 A | | 8/1977 | Smith |
| 4,053,704 A | * | 10/1977 | Smith .......................... 174/87 |
| 4,238,640 A | | 12/1980 | Tweed et al. |
| 4,314,092 A | | 2/1982 | Fleming et al. |
| 4,314,094 A | * | 2/1982 | Smith .......................... 174/78 |
| 4,423,918 A | | 1/1984 | Filreis et al. |
| 4,647,717 A | | 3/1987 | Uken |
| 4,721,832 A | | 1/1988 | Toy |
| 4,799,757 A | | 1/1989 | Goetter |
| 4,839,473 A | | 6/1989 | Fox et al. |
| 4,864,725 A | | 9/1989 | Debbaut |
| 4,963,698 A | | 10/1990 | Chang et al. |
| 5,023,402 A | | 6/1991 | King, Jr. et al. |
| 5,038,003 A | | 8/1991 | Allec et al. |
| 5,107,077 A | | 4/1992 | Fox et al. |
| 5,113,037 A | | 5/1992 | King, Jr. et al. |
| 5,140,746 A | | 8/1992 | Debbaut |
| 5,151,239 A | | 9/1992 | King, Jr. |
| 5,357,057 A | | 10/1994 | Debbaut |
| 5,431,758 A | | 7/1995 | Delalle |
| 5,567,174 A | | 10/1996 | Ericson, Jr. et al. |
| 5,631,993 A | | 5/1997 | Cloud et al. |
| 5,639,992 A | | 6/1997 | Debbaut |
| 5,644,671 A | | 7/1997 | Goetter et al. |
| 5,668,469 A | | 9/1997 | Natori et al. |
| 5,672,846 A | | 9/1997 | Marie-Louise Debbaut |
| 5,750,933 A | | 5/1998 | Brady |
| 5,764,844 A | * | 6/1998 | Mendes ...................... 385/135 |
| 5,790,740 A | | 8/1998 | Cloud et al. |
| 5,825,964 A | | 10/1998 | Goetter et al. |
| 5,850,056 A | | 12/1998 | Harwath |
| 5,883,999 A | | 3/1999 | Cloud et al. |
| 5,884,000 A | | 3/1999 | Cloud et al. |
| 5,884,001 A | | 3/1999 | Cloud et al. |
| 5,884,002 A | | 3/1999 | Cloud et al. |
| 5,884,003 A | | 3/1999 | Cloud et al. |
| 6,227,251 B1 | | 5/2001 | Ahn et al. |
| RE37,340 E | | 8/2001 | King, Jr. |
| 6,329,601 B1 | | 12/2001 | Bulford |

* cited by examiner

*Primary Examiner*—William H. Mayo, III

(57) ABSTRACT

An enclosure for a buried-cable splice. The enclosure has two parts: (i) a container having a closed end, an open end, and sealant inside, sealant inside, and (ii) splice-supporting member that is received through the open end of the container. Once inserted into the container, the splice-supporting member immerses the splice within the sealant so that the splice will be protected from its underground environment. A locking mechanism is provided which prevents withdrawal of the member from the container after assembly. The mechanism has a number of wave-shaped annular protrusions located on the inner surface of the open end of the container, and a reciprocating number of accommodating channels located on an outside engaging surface of the splice-supporting member. These channels accept the wave-shaped protrusions and thus prevent the member from being removed.

19 Claims, 5 Drawing Sheets

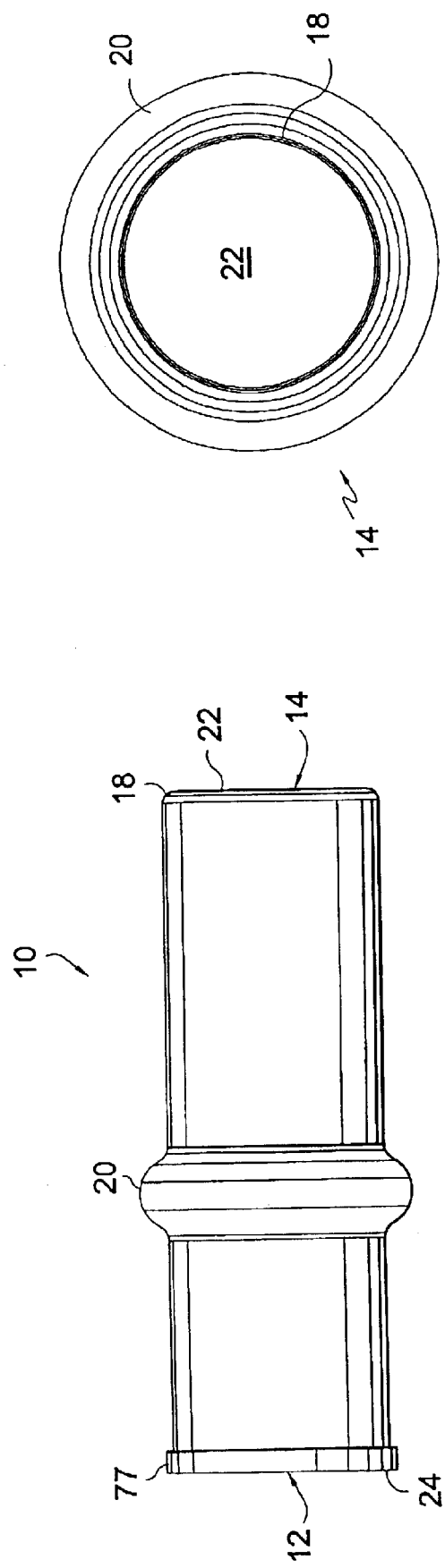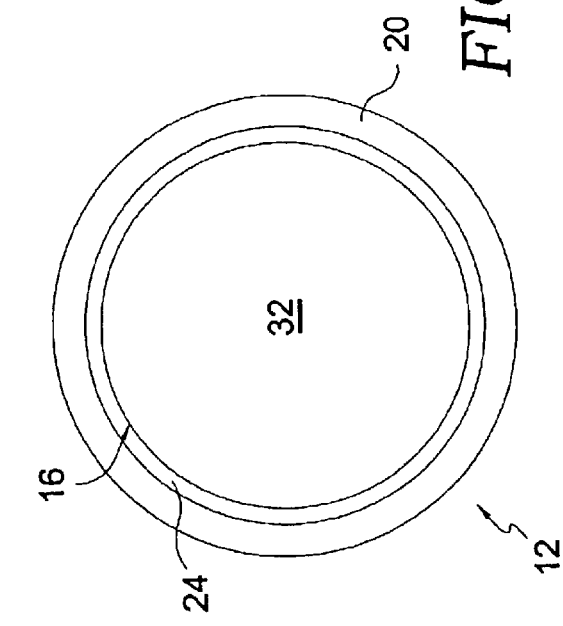
FIG. 3A.
FIG. 3B.
FIG. 3C.

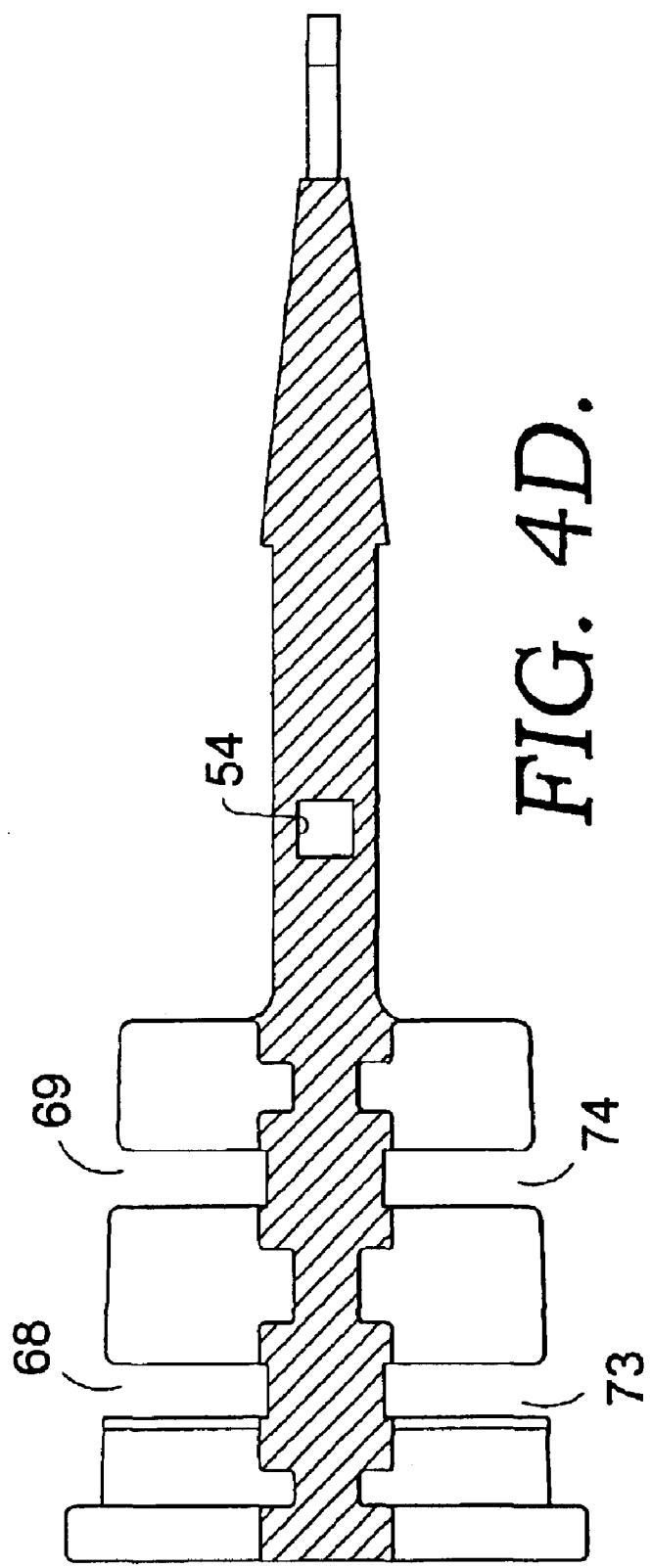

BURIED SPLICE ENCLOSURE

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

The present invention relates to underground cable splice enclosures. More specifically, the invention relates to the kind of buried splice enclosures which protect the splice by immersing it into a sealant and securing it within a shell which contains the sealant Telecommunications lines are oftentimes buried beneath the ground. It is oftentimes necessary to connect or reconnect wires using a splice. A splice is a way of electrically connecting two wires. The end of each wire is connected to the other. When such a splice is completed, it is necessary to protect it from the underground environment. This is because moisture intrusion can cause corrosion and other degradation of the wires and other associated equipment. While it is important to prevent against moisture intrusion, it is also desirable to create a splice that holds the wires securely together so that they may not be pulled apart. This is important as cable may be unintentionally snared once placed in service.

The prior art has dealt with these problems by creating an enclosure having a plug and a sleeve. In such a system, the cables are first assembled and attached on the plug, and then the plug is inserted into a sealant-containing enclosing sleeve. This causes the splice to become buried in the sealant. The sealant completely encapsulates the unjacketed portions of cable so that it will not be exposed to the underground elements when it is used in the field.

One example of a conventional encapsulating device is shown in prior art FIG. 1. Referring to the figure, the prior-art assembly 100 has two parts. The first part is a splice-supporting plug 102. The second part is a tubular sleeve 104.

Plug 102 has an encapsulating end 113 and a cable driver end 114. Cable driving end 114 is used to receive and secure the spliced portions of the cables (not pictured) in a forked collar 118. Driver end 114 is stabilized using cross members 116. Intermediate the driver end 114 and encapsulating end 113 is an arm portion 110. Arm 110 is the thinnest portion of the plug 102. On arm 110 is a plate receiving snap-lock 112. Snap-lock 112 is used in conjunction with an aperture (not shown) bored through arm portion 110. Snap-lock 112 and the aperture are used to secure two plates which are meshed together around the wires used in the splice in a manner known to those skilled in the art.

Encapsulating end 113 comprises a pair of arms 106 each having female threads 120 on an inside surface thereof. Also on encapsulating end 113 is an outer plug surface 108.

Tubular sleeve 104 comprises a closed end 124 and an open end 126. On the sleeve 104 is generally cylindrical at the open end 126 to the left of an annular rib 128 (see smooth surface 132). To the right of the annular rib 128, however, a handle portion 134 has a hexagonal cross section.

The two spliced wires are admitted into sleeve 104 via passageways which are formed by a plurality of proposed wire conforming jaws 136 as can be seen on the plug 102 in FIG. 1. Throughout, one side view showing conforming jaws 136 is shown in FIG. 1, it should be understood that the other side his identical structure. When the device 100 is used to bury a splice, the two cables to be spliced are attached to plug 102. This is done by inserting a first wire in the passageway created by opposing jaws 136 and then the arm portion 110. This is done by clamping the wire to the plug using clamping plates (not. pictured) which are secured to plate receiving snap-lock members 112. On the other side of plug 102, the identical set of clamping members on the other side create a passageway for a second wire which is then held to the arm portion 110 by an opposing plate on the opposite side of the plug, said opposing plate being held by another snap-lock (all not pictured). The forked collar 118 is what receives the actual spliced cable and supports it. This collar 118 is what is used to drive the splice into the sealant. The sealant (not pictured) is contained in the shell 104.

In order to create a water seal and protect the splice in its buried environment, plug 102 is screwed into sleeve 104. This is done by taking the plug 102 with the splice already installed on it and inserting it into forked collar end 118 first. When the splice held within forked collar 118 is pushed deeper into shell 104, the bare wire (unjacketed) is driven into the sealant (not pictured) within shell 104. Once plug 102 has penetrated a significant depth into shell 104, female threads 120 on plug 102 will engage male threads 122 on shell 104 by twisting plug 102 in a clockwise manner. This will cause the splice to be driven deep within shell 104. As plug 102 is screwed in, projection 130 will pass through the female threads 120 on each of the arms 106, and will, at least partially, prevent the plug 102 from later being unscrewed. This design, however, has proved inadequate for preventing removal of the plug because the user can easily manipulate the arms or simply unscrew with force to defeat the projection 130, and remove the plug.

The removability of the plugs in conventional devices has proved problematic. This is because such spliced devices are not designed to be reused. It has been the experience that-technicians in the field will oftentimes attempt to make a quick fix of a faulty cable splice by simply removing the plug 102, reconnecting the wires, and then reinserting the same plug into the same shell 104 rather than make a replacement of the splice using a new enclosure with fresh sealant. This temporary shortcut, however, on the whole has proved to be very costly. This is because, though the technician may save minutes by reusing an enclosure, the reused enclosure will never be as protective as would a new enclosure with fresh sealant. Significant cost is tied into making repeat calls to fix failed splices that are due to such "quick fix" repairs in which the technicians simply reuse the old device intended for replacement. Though these devices are very inexpensive to replace, the cost of a repeated call of a technician is much more expensive. Therefore, there is a need in the art for a buried splice enclosure with the sealing properties of device 100, however, with a closure system that is not easily defeated.

SUMMARY OF THE INVENTION

The present invention provides an enclosure having a cap that is nearly impossible to remove. This is accomplished by providing a container having a closed end at one end and an opening at the other end. The container has protect sealant exposed inside of it. A splice-supporting member is received through the open end of the container. Once inserted into the container, the splice-supporting member immerses the splice within the sealant so that the splice will be protected from its underground environment. More specifically, this invention provides a locking mechanism is provided which prevents withdrawal of the member from the container. The mechanism comprises a number of wave-shaped annular protrusions located on the inner surface of the container, and a reciprocating number of accommodating channels located on an outside engaging surface of the splice-supporting member. These channels accept the wave-shaped protrusions and thus prevent the member from being removed.

BRIEF DESCRIPTION OF THE DRAWING

The present invention is described in detail below with reference to the attached drawing figures, wherein:

FIG. 3A shows a side view of the container of the present invention.

FIG. 3B shows the container of the present invention as viewed from the pen end.

FIG. 3C is also of the container, but shows it as viewed from the closed end.

FIG. 4D shows a cross-sectional view of the member, said section taken down the center axis of the member.

DETAILED DESCRIPTION OF THE INVENTION

The present invention is a tamper-proof buried splice enclosure. Its features prevent reuse of the enclosure by technicians in the field. Some technicians in the field are compelled to reuse existing enclosures for convenience sake. Reuse, however, has its cost. This is because, when old enclosures are reused, they will not seal as well as would a newly manufactured one. This will likely cause the reused splice enclosure to fail early—allowing the splice to degrade—eventually causing a break in continuity. Premature splice failure will necessitate a service call much earlier than would be required if a fresh enclosure had been used in the first place. Reuse, therefore, though possibly affording immediate time-savings, will ultimately cost the company. This is because the cost of providing a new enclosure is insignificant when compared to the cost of a technician making a maintenance call. Thus, by preventing technicians from reusing old enclosures, the tamper-proof enclosure of the present invention saves the user (business) money.

Figure 1:
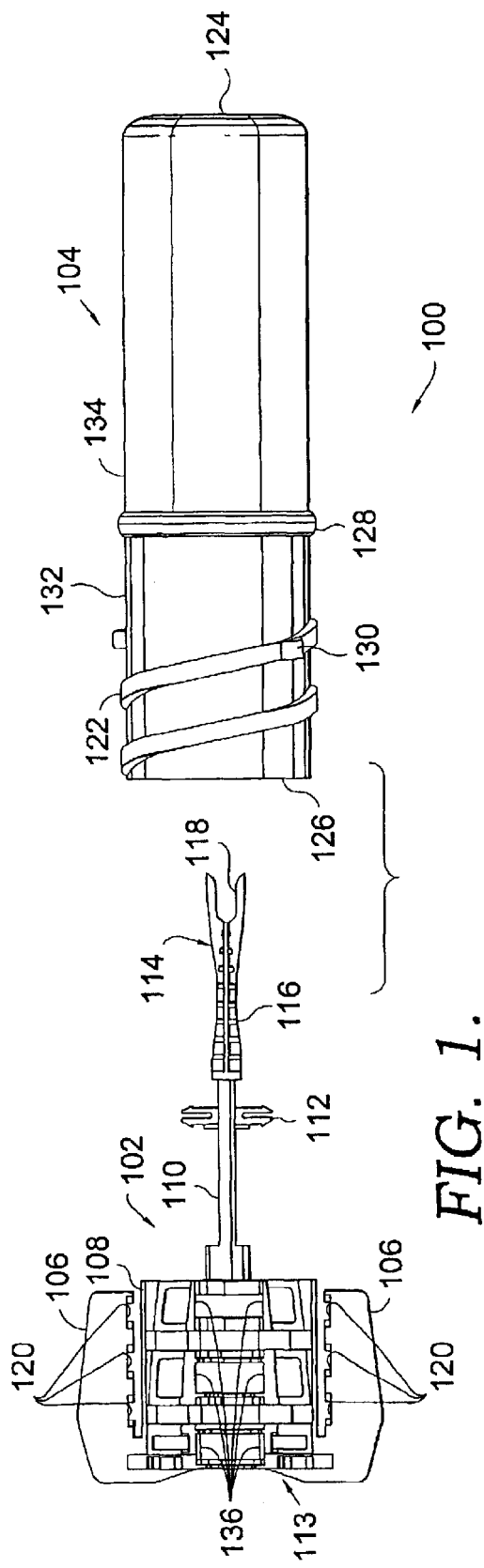
FIG. 1 shows a conventional buried-splice arrangement.
Figure 2:
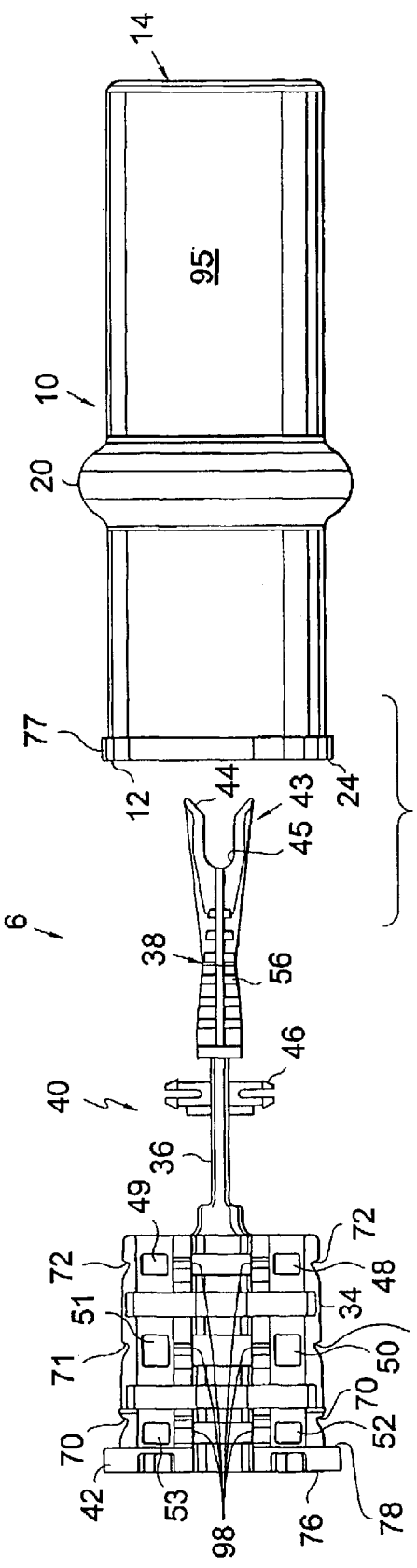
FIG. 2 discloses the buried splice cap and container arrangement of the resent invention.

An enclosure 6 of the present invention is shown first in FIG. 2. FIG. 2 shows both cable driving member 40 and a tubular container 10 of enclosure 6. Container 10 has a receiving end 12 and a closed end 14. Closed end 14 is substantially flat, except it is rounded at its peripheral edge 18 where it meets up with tubular housing of container 10.

Container 10 defines an outwardly extending bulbous portion 20. Portion 20 is used during insertion of member 40 into container 10, as will be described hereinafter.

Receiving end 12 of container 10 defines an opening or mouth 16. It also has a peripheral flange 77 having an abutment surface 24. Surface 24 presses against an abutment surface 78 on a head 42 of member 40 as will be described hereinafter.

FIG. 2 shows the orientation of driving member 40 relative to container 10 before insertion of said member 40. As can be seen from the figure, a forked end 43 of member 40 is inserted within container 10. Upon insertion, forked end 43 will penetrate a sealant (not pictured) which is predisposed in container 10. The splice is securely held in a collaring surface 44 of the forked end 43. The splice along with forked end 43 will be pushed deep within the sealant almost to the extent of the closed end 14. There, the splice will be held protectively within the sealant in a manner that is known to those skilled in the art, and will be protected from the elements.

Member 40 has outside surfaces 32 and 34 that are received within the open end 12 of container 10. Because outside diameters of surfaces 32 and 34 are substantially equal to the inside diameter of open end 12, member 40 is able to slide in to open end 12. Upon this occurring, the open end 12 will be substantially plugged by member 40. The member will penetrate the container until the abutment surface 78 engages abutment surface 24. Long channels with wave-shaped cross sections 70, 71, and 72 are used to secure member 40 within container 10 such that it may not be removed. These channels 70, 71, and 72 on member 40, and their reciprocating internal ribs 26, 28, and 30 (respectively, See FIG. 3D) serve to lock member 40 within container 10.

FIG. 3B shows the opening 16 in the receiving end 12. The interior of the container 32 is where the sealing-material is located, as will be known to those skilled in the art. FIG. 3C is looking at the container 10 from its closed end 14. In this figure, the flat circular wall 22 with its rounded edge 18 may be seen. Additionally, the peripherally outwardmost parts of bulbous portion 20 may be seen as well.

Figure 3D:
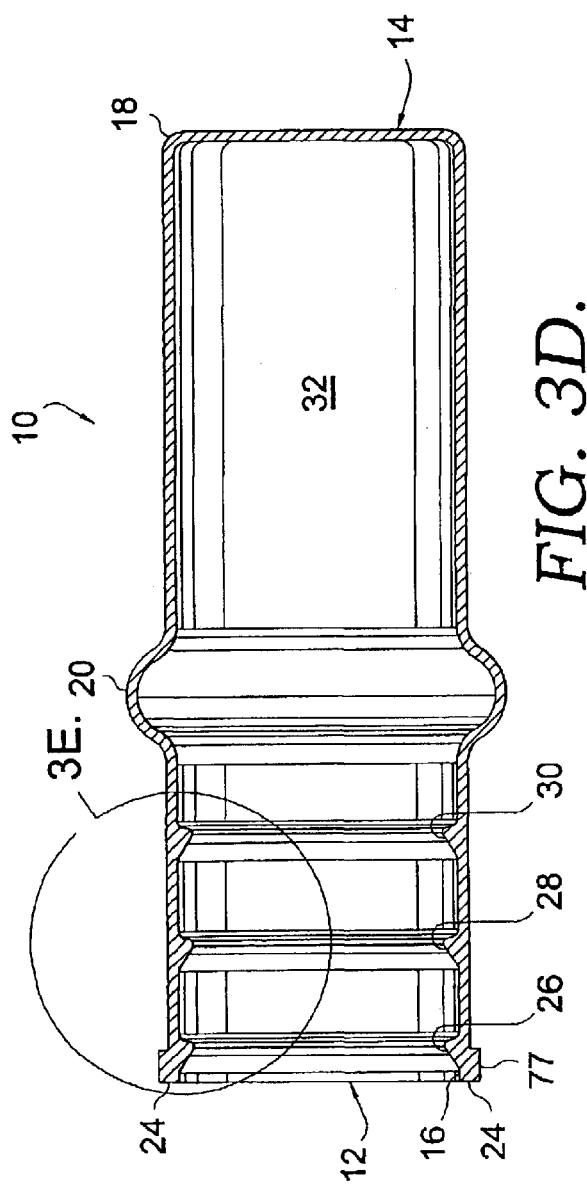
FIG. 3D is a sectional view of the container of the present invention, said view taken in a plane inserting the center axis of said container.
Figure 3E:
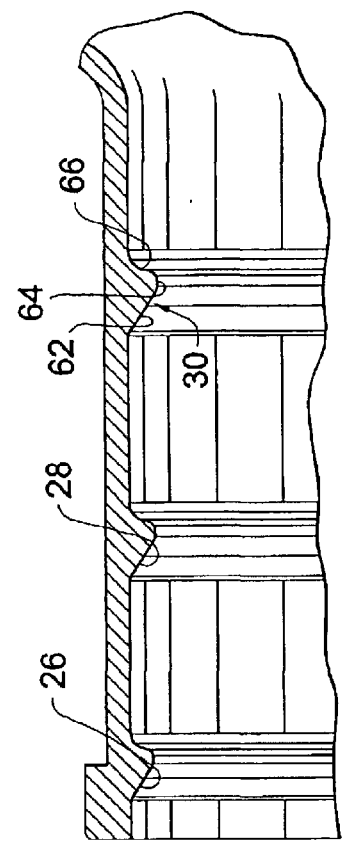
FIG. 3E is a detailed view-showing the protrusions from the inside surface of the container of the present invention.

FIGS. 3D and 3E show the details of the innards of container 10, including shallow interlocking rib 26, a middle inner rib 24 and a deep inner rib 30 each of said ribs having a wave-shaped cross sections. FIG. 3E shows the configurations of each of ribs 26, 28, and 30 in more detail. Each of these ribs has a sloped face 62, an annular crest 64 and a barrier face 66. These features are uniquely configured to, in conjunction with each of channels 70, 71, and 72 to lock the member 40 securely within container 10 such that it is virtually unremovable once the member is secured within said container.

Figure 4C:
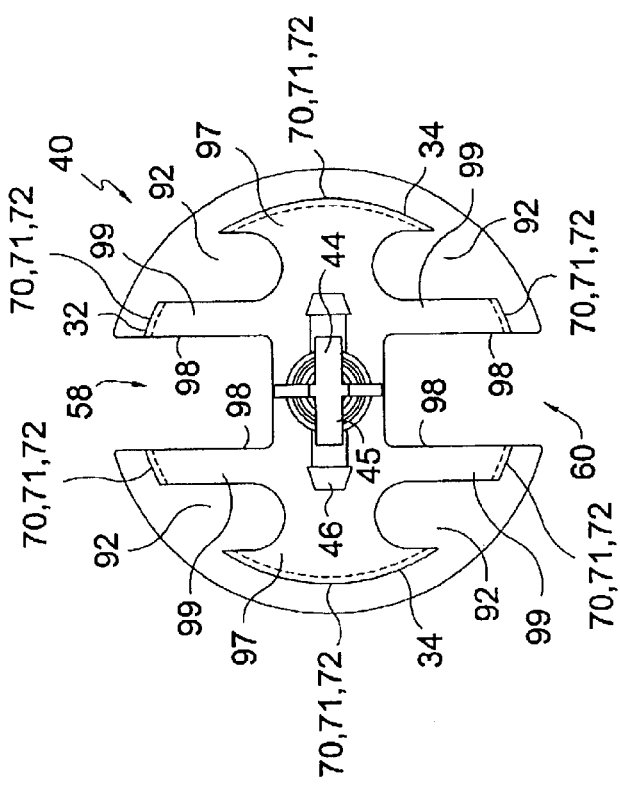
FIG. 4C shows the member of the present invention as viewed from the end with the collar.
Figure 4E:
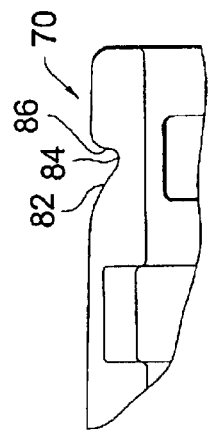
FIG. 4E is a detailed view of a channel of the present invention.
Figure 4A:
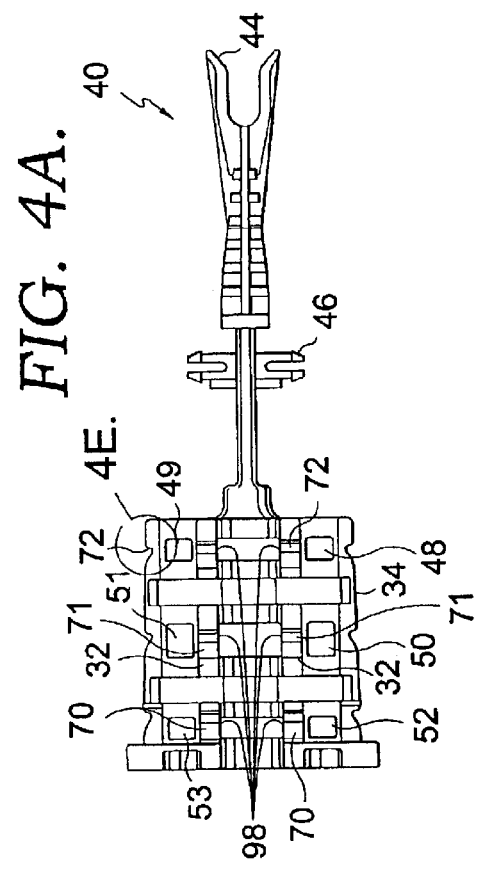
FIG. 4A shows the member of the present invention from its side.

The specifics regarding the cable driving member 40 are disclosed in FIGS. 4A through 4E. Referring first to FIG. 4A, it may be seen that a number of mass reduction cross apertures 48, 49, 50, 51, 52 and 53 are defined by member 40. These apertures are large enough to reduce the overall material required during manufacture, yet still small enough that structural integrity is not compromised.

FIGS. 4A and 4C show the cable permitting mechanisms of member 40. Referring first to FIG. 4C we see that cable passageways 58 and 60 are formed through the member longitudinally. Thus, passageways 58 and 60 each receive a separate cable. Each cable runs alongside the stem 36 of said member 40. The unjacketed wire to be spliced is received in the forked end of the member. FIG. 4A reveals that passageways are formed by a number of opposing faces 98 on each side of said member 40. Even though only one side of member 40 is shown in FIG. 4A, it is to be understood that the opposite not-pictured side has identical structure.

As may also be seen in FIG. 4A, four gaps 68, 69, 73, and 75 are formed in said member to remove unnecessary mass while maintaining structural integrity. These gaps may also be seen in FIG. 4D which shows a section of the member of the present invention taken down the middle of the member shown in FIG. 4A.

FIG. 4C is a forked-end view of member 40. From this view, longitudinal scoops 92 may be seen. These, like gaps 68, 69, 73, and 75 also serve mass-reduction purposes while still enabling structural integrity.

Figure 4B:
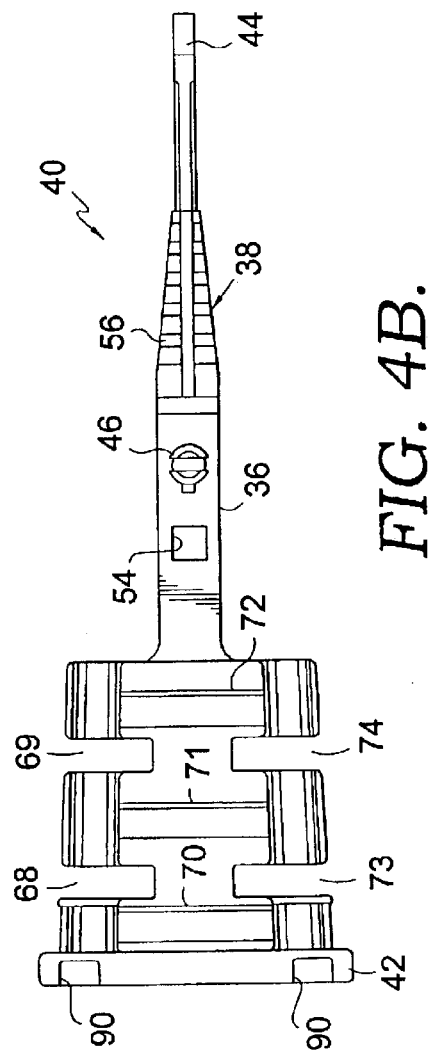
FIG. 4B shows the member of the present invention from above (or below, as the two views are identical).

Similarly, as may be seen in FIG. 4B, cross-sectional scoops 90 in rim 42 also serve mass-reduction purposes. Another feature shown in FIG. 4B is the bi-directional locking peg 46 and a corresponding bolt receiving square hole 54. These features are known in the prior art. Pegs 46 is used to poke through one hole in a metal plate (not pictured), and hole 54 is used to receive a bolt that is used to secure the plate to stem 36. This arrangement is known to those skilled in the art, and thus, not a part of the present invention. A second plate (also not pictured) is secured to the opposite side of stem 36 is the same manner. Together, these plates are used to clamp down one cable on each side of stem 36 (also not pictured) such that they may not be pulled out of passageways 58 and 60. Thus, the cable will be held snuggly within the plug.

The features on member 40 that make it unremovable are three wave-shaped channels 70, 71, and 72. These channels may also be seen in FIG. 4C as being present on a pair of portions having battle-axe-like cross sections 97 and also present on the ends of four cross-sectional-extending portions 99. Channels 70, 71, and 72 terminate at the openings created by passageways 58 and 60 and scoops 92. FIG. 4E shows a close-up view of one of these channels. All of channels 70, 71, and 72 have identical cross sections. Channel 70 has been selected to show the cross-section for each of channels 70, 71, and 72 in more detail. In FIG. 4E, we see each channel cross-section has a gradual dropoff 82, a trough 84 and a steep rise 86. Comparing these cross-sectional features to those of corresponding ribs, 26, 28 and 30, disclosed in FIG. 3D, we see that the two correspond inversely, one to the other. That is, that each (i) sloped face 62, (ii) annular crest 64, and (iii) barrier face 66 of each inner rib (26, 28, 30) of container 10 corresponds inversely to the cross-sectional profile of each (i) gradual dropoff 82, (ii) trough 84, and (iii) steep rise 86 of each channel (70, 71, and 72) on member 40. This causes the ribs to snap into the channels when the member 40 is inserted into the container 10.

In operation, the member 40 of the enclosure 6 of the present invention is first prepared for insertion. This is done by installing the cables (not pictured) on the member. The cables are drawn up against each side of the member 40 through each of channels 58 and 60 between the opposing faces 98. The exposed tip on each cable, where the jacket has been removed, is then spliced together with the unjacketed tip of the other. These spliced tips are then secured in the collar 44 of member 40. Once the splice is secured in collar 44, the cables are secured to stem 36 by mashing them between a pair of metal plates in a manner known to those skilled in the art.

Once the cables are secured, member 40 is ready to be inserted into container 10. To do so, the collar end 44 of member 40 will first be inserted through container opening 16. A user will typically do this by holding member 40 in one hand while gripping an exterior surface 95 near the closed end 14 of container 40 in the other. The container-gripping hand may be pressed against the outwardly extending bulbous portion in order that more insertion force may be obtained.

The inside of container 10 is typically about full of sealant. The sealant typically silicone grease; petroleum jelly or amphorous calcium carbonate is disposed from the closed end of the container to the open end (or close thereto). Because of this, the splice, contained within collar 44, will be immersed into the sealant when the member is inserted. Once member 40 is over half way in, the plugging surface 34 will be received within opening 16. Next, shallow rib 26 on the inside of container 10 will snap into the forward-most channel 72 on the member 40. By maintaining insertion force, however, rib 26 will move out of channel 72, and on to channel 71. This further insertion is allowed because of the opposed surfaces of the ribs and channels. When insertion of member 40 is compelled, the gradually sloped face 62 of the rib is engaged with gradual dropoff 82 of the channel. The gradual pitch of the engaged sloping surfaces offers some, but nominal resistance to insertion. Once rib 26 is snapped into channel 71, rib 28 will simultaneously snap into channel 71. Upon further application of insertion force, rib 26 will make it to its final destination, and snap into channel 70. Once this happens, ribs 28 and 30 will be similarly locked into channels 71 and 72, respectively, and the member is permanently held within container 40.

The installation is made permanent by the barrier faces 66 on each of the ribs and the steep rise surfaces 86 on each of the channels. This is because when any force is applied that would remove member 40 from container 10, each of the barrier faces 66 would engage the steep rise surfaces 86. Because these opposing surfaces (66 and 86) are nearly normal to the movement of the member and container relative to one another, the member is unremoveable once it is fully inserted.

It is important to note that although the locking mechanism of the invention is shown as having the wave-shaped channels 70, 71, and 72 on splice-support member 40, and the protruding annular ribs 26, 28 and 30 on the inside surface of container 10, that the ribs and channels could be reversed. In such a reverse arrangement, ribs 26, 28 and 30 could be defined by the outer surface 34 of member 40 and reciprocating channels defined by the inside surface of container 40.

Also possible, is that more or less pairs of channels and corresponding ribs could be used. For example, though only three ribs are shown here, but more could be used as well and still fall within the scope of the present invention. Fewer ribs could also be used. The same is true regarding channels. Three are used in the preferred embodiment. However, more or less than three could be used as well.

Thus, there has been shown and described a locking buried spice enclosure. Many changes, modifications, variations, and other uses and applications of the subject invention will, however, become apparent to those skilled in the art after considering this specification together with the accompanying figures and claims. The same device, together with ensuing benefits is also applicable to similar equipment in unrelated industries. All such changes, modifications, variations and other uses and applications which do not depart from the spirit and scope of the invention are deemed to be covered by the invention which is limited only by the claims which follow.

The claimed invention is:

1. A device for enclosing spliced cables, comprising:

a container having an opening, an inside surface, and an outside surface;

protective matter disposed inside said container;

a splice-supporting member being receivable through said opening of said container such that a cable splice supported on one end of said member may be inserted into said container through said opening and thus immersed in said protective matter; said splice-supporting member further defining at least one passageway therethrough for the receipt of cables; and a locking mechanism for preventing withdrawal of said member from said container, said mechanism comprising a protrusion which is received in a channel; one of said protrusion and channel being defined by an outside surface of said member, the other of said protrusion and channel being defined by an inside surface of said container, said protrusion having a gradually-sloped face on a first side and a barrier face on a second side; said gradually-sloped face engaging a gradual dropoff face on a first side of said channel, and said barrier face engaging a steeply rising face on said second side of said channel when a user attempts to remove the member from said container.

2. The device of claim 1 wherein said container is substantially cylindrical and said protrusion extends annularly inward from the inside surface of the container.

3. The device of claim 2 wherein said protrusion is defined by said inside surface of said container so as to be substantially annular within the container.

4. The device of claim 3 wherein said protrusion has a wave-shaped cross section.

5. The device of claim 1 wherein said channel is defined by a portion of the outside surface of said member, said outside surface of said member slidably receivable by said inside surface of said container.

6. The device of claim 5 wherein said channel is formed as a partial annular rib about the portion of the outside surface of said member.

7. The device of claim 6 wherein said channel has a wave-shaped cross section.

8. The device of claim 1 further comprising:

an additional protrusion which is received in an additional channel; one of said additional protrusion and additional channel being defined by an outside surface of said member, the other of said additional protrusion and additional channel being defined by an inside surface of said container.

9. The device of claim 8 further comprising:

a third protrusion which is received in a third channel; one of said third protrusion and third channel being defined by an outside surface of said member, the other of said third protrusion and third channel being defined by an inside surface of said container.

10. A protective enclosure comprising:

a member having first and second ends;

said first end having a substantially cylindrical outside surface and defining at least two cable-receiving axial passageways therethrough; said second end adapted to support a splice thereon;

a substantially tubular container with closed and open ends;

said open end adapted to receive said splice-supporting second end and then engage said substantially cylindrical outside surface of said first end to substantially plug said container; and an annular rib which is received in an annular channel; one of said rib and channel being defined by an outside surface of said member, the other of said rib and channel being defined by an inside surface of said container, said rib having a gradually-sloped face on one side and a barrier face on another side, said channel having a gradual dropoff on one side which engages said gradually sloped face when said member is received into said container, said channel also having a steep rise on another side which engages said barrier face when a user attempts to remove the member from said container.

11. The device of claim 10 wherein said rib extends inward from the inside surface of the container.

12. The device of claim 11 wherein said rib is defined by said inside surface of said container so as to be annular within the container.

13. The device of claim 12 wherein said rib has a wave-shaped cross section.

14. The device of claim 13 wherein said channel is defined by a portion of the outside surface of said member, said outside surface of said member slidably receivable by said inside surface of said container.

15. The device of claim 14 wherein said channel is formed as a partial annular ring about the portion of the outside surface of said member.

16. The device of claim 15 wherein said channel has a wave-shaped cross section.

17. The device of claim 10 further comprising:

an additional rib which is received in an additional channel; one of said additional rib and additional channel being defined by an outside surface of said member, the other of said additional rib and additional channel being defined by an inside surface of said container.

18. The device of claim 17 further comprising:

a third rib which is received in a third channel; one of said third rib and third channel being defined by an outside surface of said member, the other of said third rib and third channel being defined by an inside surface of said container.

19. A protective enclosure comprising:

a member having first and second ends;

said first end having a substantially cylindrical outside surface and adapted to allow the introduction of cable therethrough for the purpose of enabling a splice inside the enclosure;

a substantially tubular container with closed and open ends;

said open end adapted to receive said second end of said member and also engage said substantially cylindrical outside surface of said first end to substantially plug said container; and an annular rib which is received in an annular channel; one of said rib and channel being defined by an outside surface of said member, the other of said rib and channel being defined by an inside surface of said container said rib having an offset-shark-toothed cross section which makes said rib receivable into and lockable within said channel which has a reciprocating cross-sectional shape.

* * * * *